A. CROWE.
TIRE.
APPLICATION FILED MAY 6, 1910.

1,043,402.

Patented Nov. 5, 1912.

2 SHEETS—SHEET 1.

Witnesses

Inventor
Alexander Crowe

By
Attorneys

A. CROWE.
TIRE.
APPLICATION FILED MAY 6, 1910.
1,043,402.
Patented Nov. 5, 1912.
2 SHEETS—SHEET 2.
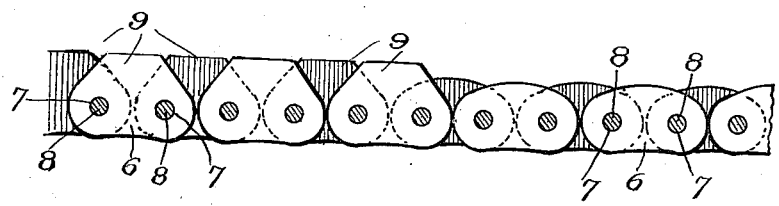
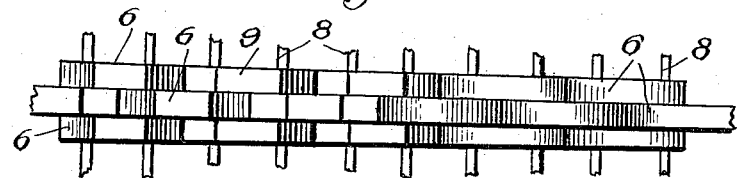
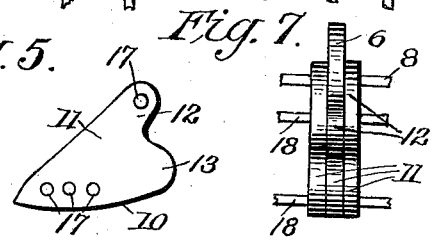
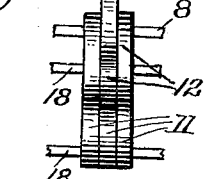
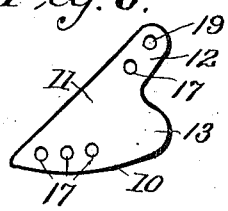
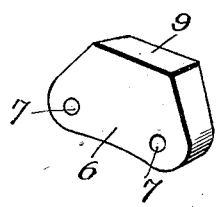
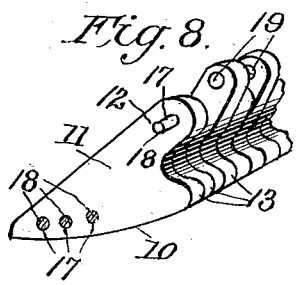
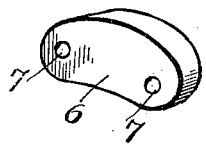
Inventor
Alexander Crowe

UNITED STATES PATENT OFFICE.

ALEXANDER CROWE, OF YOUNGSTOWN, OHIO.

TIRE.

1,043,402.  Specification of Letters Patent.  Patented Nov. 5, 1912.

Application filed May 6, 1910. Serial No. 559,769.

*To all whom it may concern:*

Be it known that I, ALEXANDER CROWE, a citizen of the United States, residing at Youngstown, in the county of Mahoning and State of Ohio, have invented certain new and useful Improvements in Tires, of which the following is a specification.

The present invention comprehends certain new and useful improvements in tires for vehicle wheels, and the object of the invention is an improved armored pneumatic tire which is free from the liability of puncture, and which also possesses a maximum resiliency of structure so as to serve in its usual capacity to absorb the shocks incident to travel, the tire being quite strong and durable and being so formed as to effectually prevent skidding.

The invention consists in certain novel constructions, combinations, and arrangements of the parts, that are hereinafter fully described and claimed.

For a full understanding of the invention and the merits thereof, and to acquire a knowledge of the details of construction, reference is to be had to the following description and accompanying drawings, in which:—

Figure 1:
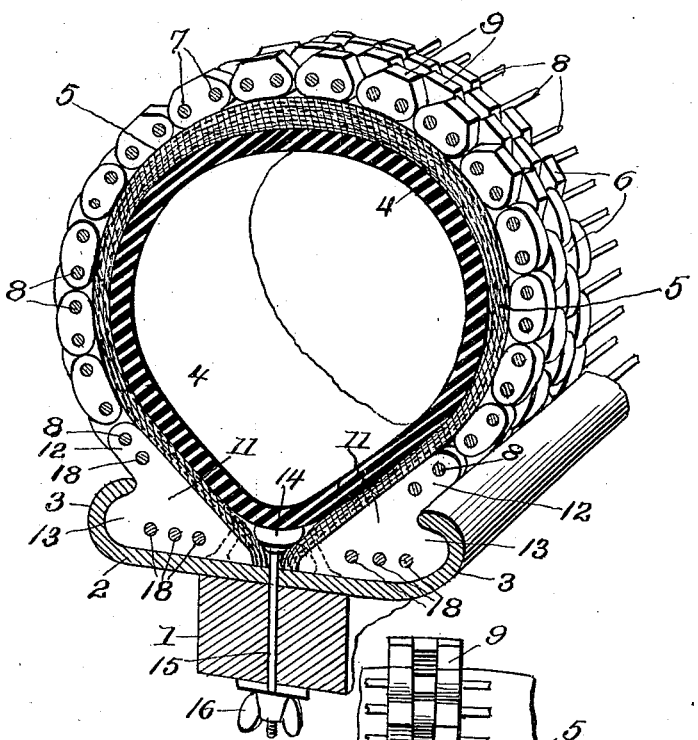
Figure 2:
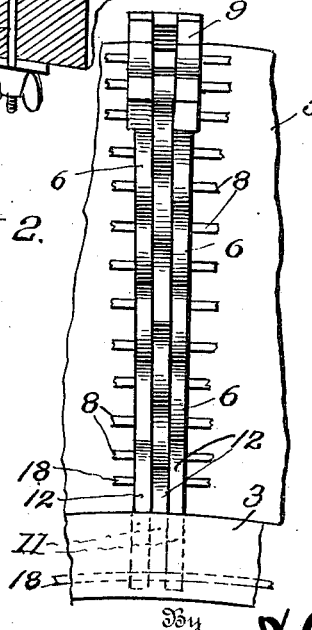

Figure 1 is a fragmentary sectional perspective view of a tire constructed in accordance with my invention: Fig. 2 is a fragmentary side elevation thereof: Fig. 3 is a fragmentary transverse section of the armor detached: Fig. 4 is a top plan view thereof: Figs. 5 and 6 illustrate the two different forms of the sections of the attaching members: Fig. 7 is a fragmentary view illustrating the connection between alternate sections of an attaching member and an adjacent link: Fig. 8 is a fragmentary perspective view of one of the attaching members: and, Figs. 9 and 10 are detail perspective views of the intermediate and end links respectively.

Corresponding and like parts are referred to in the following description and indicated in all the views of the drawing by the same reference characters.

Referring to the drawings, the numeral 1 designates the felly of a vehicle wheel of any desired or approved construction. The felly is equipped with a clencher rim 2, the side edges of which are returned outwardly in the customary manner, as indicated at 3. An inner tube 4 encircles the clencher rim and is formed of rubber or other flexible material such as is commonly used in pneumatic tires.

As hereinbefore premised, the present invention resides broadly in an improved armor which is applied to the exterior of the inner tube. The armor has a fabric lining 5 which is composed of several thicknesses of canvas or like material that have been rendered water-proof by any suitable process, said lining completely inclosing the pneumatic tube with its longitudinal edges meeting at the inner side of the tube and between the returned edges of the clencher rim.

The body of the armor is composed of a plurality of links 6 which are in the form of metallic disks or plates and are disposed perpendicularly with respect to the outer face of the lining and transversely with respect to the axis of the tire. The links are arranged in a multiplicity of series which extend transversely about the tire, the links of each series bearing a staggered relation to the next adjacent series or rows on both sides thereof, and being arranged in abutting relation to the links of said series so as to provide a solid metallic structure which presents an almost continuous metallic surface and thus protects the tire from puncture.

Each link is somewhat elongated and is formed with a pair of apertures or eyes 7 extending therethrough, the respective apertures being located in proximity to the opposite ends of the link. By means of these apertures each link is threaded upon two adjacent longitudinal strands 8 of wire or the like. There are a plurality of these strands which are spaced apart transversely and are coursed longitudinally about the tire to connect the links together and retain them in the relative positions hereinbefore described. The number of longitudinal strands depends upon the number of links in a transverse series, there being, in the present instance, twice as many strands as there are links in a series.

A very important feature of the present invention resides in the fact that each of the links is formed with separate apertures through which the adjacent strands are threaded. This insures of the longitudinal strands being held in proper transversely spaced relation, and also prevents the links from shifting transversely with respect to the tire, as is, of course, necessary in order that the armor may offer an effectual resistance to any skidding movement of the wheel. The links are further braced against lateral movement by arranging the meeting ends of the links of each series in abutting relation, the ends of each link being rounded in concentric relation to the adjacent threading apertures 7 so that the meeting ends of the links are adapted to roll on each other to permit the links to turn freely on the longitudinal strands 8, when subjected to pressure, and thus accommodate themselves readily to the yielding action of the pneumatic tube. By having the links threaded on the longitudinal strands, there is a tendency to transmit any turning movement of one of the links to the adjacent links, and therefore a quick action of the armor is obtained and a speedy recovery insured.

All of the links of each series have concave inner edges so as to seat firmly upon the curved outer face of the lining. A plurality of adjacent links near the middle of each series are extended at their outer edges to constitute calks 9, these links being disposed upon the tread surface of the tire so that the calks provide a roughened tread and prevent the wheel from slipping upon the road. The calks taper outwardly and for this purpose their end edges converge as shown, the said end edges being arranged substantially in tangential relation to the rounded ends of the links. The outer edges of the calks are substantially flat. When the intermediate links are subjected to pressure they are turned upon the longitudinal strands so that the outer edges of the calks lie substantially in the same plane. The tread surface is thus substantially flat in a transverse direction, which is a manifest desideratum in order to provide a broad bearing upon the road. Considerable leverage is obtained on these intermediate links through the medium of the calks projecting outwardly therefrom, and this of course expedites the turning movement of the links on the longitudinal strands and renders such turning movement more positive. The links in proximity to the ends of each series lie against the sides of the tire and are preferably of thinner material than the above-mentioned intermediate links and are tapered slightly in thickness toward the terminals of the series in order to compensate for the decreased circumferential area of the tire. The making of the end links of thinner material renders the armor lighter, but does not detract from the strength of the armor on account of the fact that the end links do not come into contact with the ground and are not subjected to wear. The calks 9 are only provided on the said intermediate links of each series, the outer edges of the remaining or end links being convex and lying within the peripheral line of the outer edges of the calks.

To secure the casing or armor about the pneumatic tube and to the clencher rim, I provide separate attaching members 10 which extend along the respective longitudinal edges of the lining 5. The attaching members are interposed between the lining and the clencher rim 2 and are substantially wedge-shaped in cross section and have their tapered ends disposed toward each other, as best seen in Fig. 1. Each attaching member is composed of a series of separate transverse sections 11 which are placed in abutting relation to each other, each section being wedge-shaped to conform to the cross-sectional contour of the attaching member. The various sections are separately fastened to the lining by rivets, screws or other suitable means. At their larger ends the sections are formed with reduced necks 12 that lie against the lining, while between these necks and the clencher rim the sections are provided with similar laterally disposed projections 13. The projections of the sections of each series co-act to constitute a locking rib or flange that is adapted to be held in engagement with the adjacent returned edge 3 of the clencher rim. I preferably employ a plurality of draw plates 14 which are inserted between the pneumatic tube 4 and the lining and are interposed between the attaching members, the draw plates having stems 15 that pass inwardly through the clencher rim and felly and are screw threaded to engage with nuts 16. Upon the tightening of the nuts the plates 14 are drawn inwardly, whereby to spread the attaching members apart and to force the locking ribs firmly in engagement with the returned edges 3 of the clencher rim and retain them in such engagement against accidental displacement.

Apertures 17 extend through the body portion and neck of each section 11 in order that all of the sections of each attaching member may be threaded upon longitudinal strands 18 of wire or the like, which are coursed circularly about the tire. The necks of alternate sections of each attaching member are extended outwardly beyond the remaining necks in order to interlock with the body portion of the armor and to compensate for the staggered disposition of the rows of links. The ends of all of the necks are rounded and bear against the rounded ends of the adjacent terminal links of the respective rows. The extended necks are formed with apertures 19 through which the extreme longitudinal strands 8 are threaded, whereby to effectually retain the body and the attaching members in association. The linked armor is thus retained in place on the exterior of the lining without the necessity of employing fastenings for securing the separate links to the lining. The advantage of this arrangement the turning movement of the links on the longitudinal strands 8 is not hindered, as would be the case if said links were secured separately to the lining.

Attention is particularly directed to the fact that the outer edges of the calks are shorter than the distance between the outer edges of adjacent calks of the same row. The oppositely inclined end edges of each calk cross the end edges of the adjacent calks in the rows on both sides thereof. By virtue of this construction the calks grip the ground with a pinching action when the tread of the tire is flattened under pressure. The liability of slipping and skidding is thus reduced to a minimum.

Having thus described the invention, what is claimed as new is:—

An armor for pneumatic tires including a plurality of solid links disposed perpendicularly to the periphery of the tire and extending in series transversely with respect thereto, the links of adjacent series being in contact sidewise and being alternately arranged, each of said links comprising an integral block having an inner concave edge merging at its ends into an arcuate edge portion and the links of each series being arranged with their arcuate portions abutting to roll one against another, the outer edge of each link of each series extending across the space between the adjacent ends of adjacent links in the adjacent series, the outer edges of the side links of each series being convex and the outer edges of the intermediate links of each series being flat, a plurality of longitudinal pivoting strands passing through all of the links at the centers of curvature of the arcuate end portions thereof, and attaching members having their ends provided with projections adapted to engage a wheel rim and with necks to fit against the end links of the transverse series of links, the alternate necks being elongated to fit between the projecting end links and be hung on the outermost pivoted strands.

In testimony whereof, I affix my signature in presence of two witnesses.

ALEXANDER CROWE. [L. S.]

Witnesses:
H. A. ERNST,
S. A. HERMAN.

---

Copies of this patent may be obtained for five cents each, by addressing the "Commissioner of Patents, Washington, D. C."